United States Patent [19]

Talboom, Jr. et al.

[11] 3,839,898

[45] Oct. 8, 1974

[54] DETERMINATION OF THERMAL PROFILE HISTORY OF HIGH TEMPERATURE PARTS

[75] Inventors: Frank P. Talboom, Jr., Glastonbury; John N. Mushovic, Amston, both of Conn.

[73] Assignee: United Aircraft Corporation, East Hartford, Conn.

[22] Filed: Nov. 22, 1972

[21] Appl. No.: 308,878

[52] U.S. Cl. .................... 73/15 R, 73/339 R
[51] Int. Cl. .................. G01n 25/00, G01r 3/04
[58] Field of Search .................. 73/339, 362, 15; 117/107.2

[56] References Cited
UNITED STATES PATENTS

| | | | |
|---|---|---|---|
| 3,182,507 | 5/1965 | Rogen | 73/362 |
| 3,186,228 | 6/1965 | Lever et al. | 73/362 |
| 3,544,348 | 12/1970 | Boone et al. | 117/107.2 |
| 3,595,712 | 7/1971 | Boone et al. | 117/107.2 |
| 3,690,934 | 9/1972 | Galmiche et al. | 117/107.2 |

FOREIGN PATENTS OR APPLICATIONS

| | | | |
|---|---|---|---|
| 1,080,682 | 4/1963 | Germany | 73/362 |

*Primary Examiner*—Herbert Goldstein
*Attorney, Agent, or Firm*—Richard N. James

[57] ABSTRACT

A method for determining the thermal history encountered by gas turbine engine parts exposed to high temperatures. Using the diffusion response of a conventional coating applied to the parts at low temperature, the discernible, irreversible metallurgical changes are correlated to known standards to provide the desired thermal history of the parts.

3 Claims, 7 Drawing Figures

REFRACTORY METAL CARBIDE LAYER THICKNESS
AT 1000X VERSUS TEMPERATURE °F

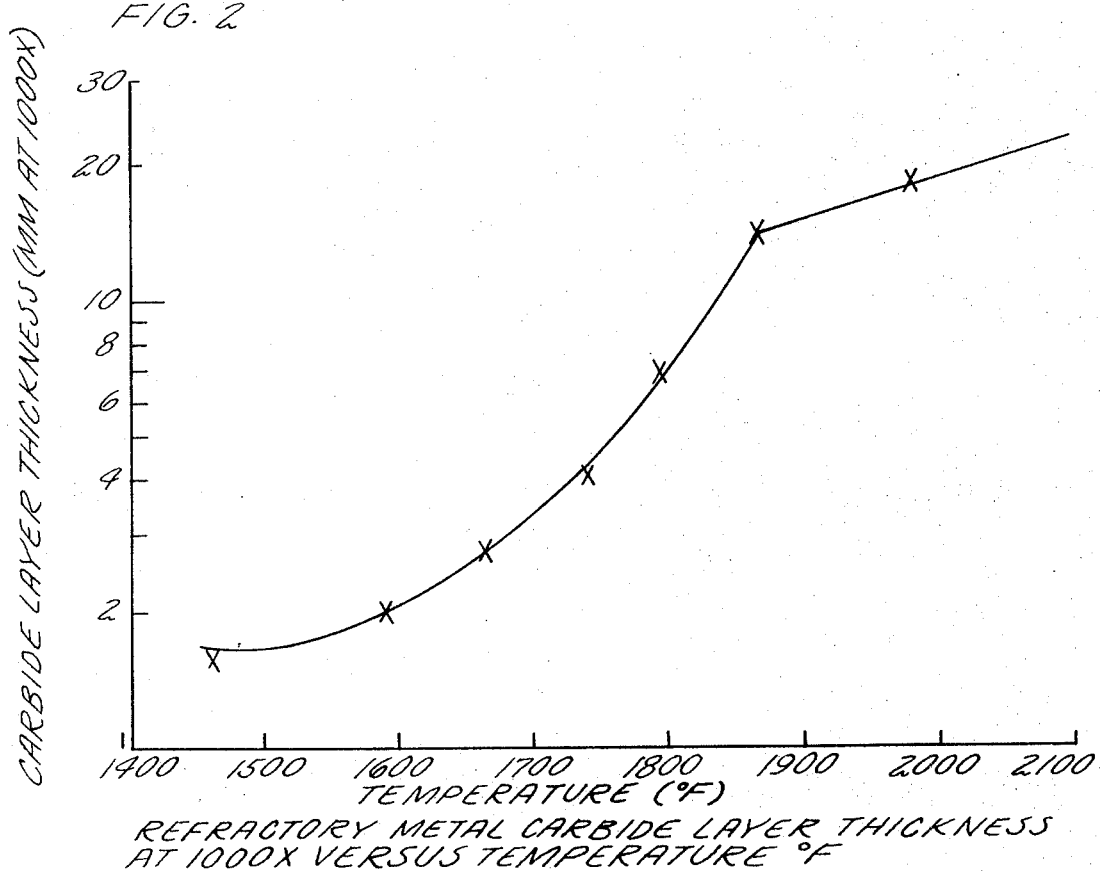
REFRACTORY METAL CARBIDE LAYER THICKNESS AT 1000X VERSUS TEMPERATURE °F
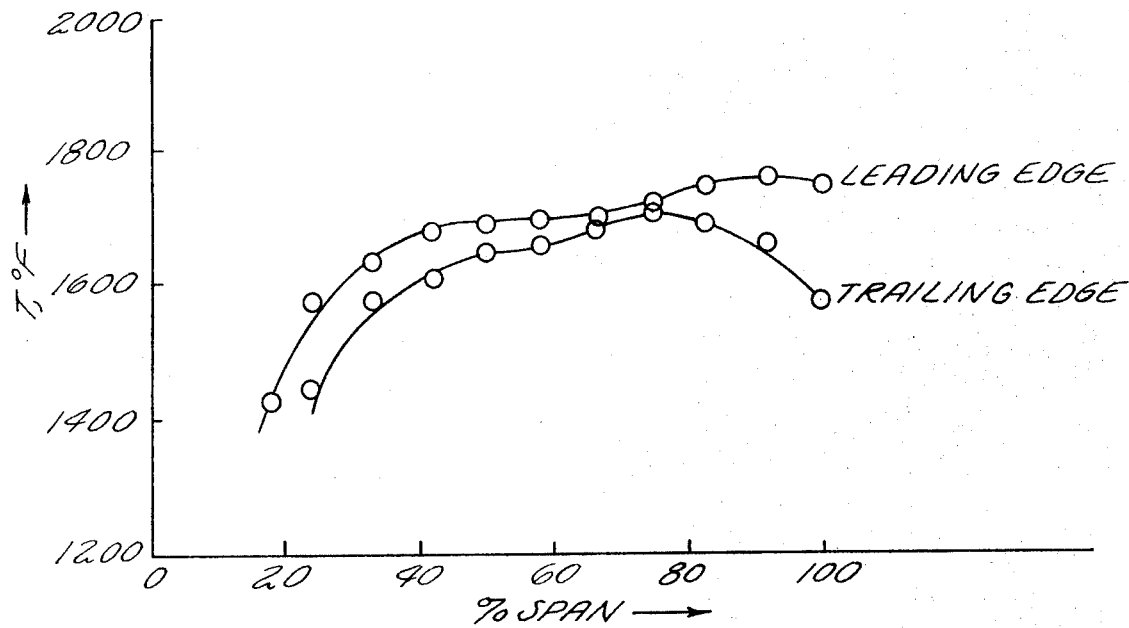

DETERMINATION OF THERMAL PROFILE HISTORY OF HIGH TEMPERATURE PARTS

BACKGROUND OF THE INVENTION

The present invention relates in general to testing methods, particularly those adapted to the generation of the thermal history of a part exposed to high temperatures.

The gas turbine engine designer requires precise knowledge of not only the temperatures to which various sensitive engine parts are exposed during operation but also the distribution of temperatures along such parts. The methods previously used in the industry for determining temperature profiles on parts of complex geometry, such as blades and vanes, have included direct instrumentation with thermocouples, radioactive krypton tracer techniques and the use of temperature sensitive paints. Each technique has its own advantages, but each has its own limitations as well.

It is, of course, known that temperature/time relationships may be determined by reference to changes in the color of materials or to metallurgical changes therein. In the patent to Yee, U.S. Pat. No. 3,415,122, for example, a temperature indicating ceramic film is used which records a temperature profile by means of comparative crystal growth as a unique function of exposure. This system appears to be particularly adapted to the recordation of temperatures during time durations of several seconds to several minutes and, thus, is well adapted to such applications as missile nose cones and earth reentry temperature measurements.

While a limited number of gas turbine engine measurements may be of short duration and reflect a transient condition, the major measurements for which a thermal history is desired may range from several minutes to many hours. In particular the steady state conditions after an engine stabilization has occurred are of great importance.

SUMMARY OF THE INVENTION

The present invention contemplates the use of a coating/substrate combination wherein exposure to complex temperature condition in the range of 1,450°–2,100°F. causes an irreversible diffusion reaction to occur as a function of time and temperature resulting in distinct metallurgical changes which can be related to known standards to define and record the requisite temperature history.

In a preferred embodiment, a slurry coating consisting primarily of aluminum is utilized on a nickel-base alloy and the thermal history profile is determined as a function of the refractory metal carbide layer thickness under such coating.

BRIEF DESCRIPTION OF THE DRAWINGS

FIG. 1A is 500X. FIGS. 1B – 1E are 1000X.

FIG. 2 is a plot of carbide layer thickness versus temperature for the same system.

FIG. 3 is a plot of the longitudinal leading and trailing edge temperatures of a turbine engine blade.

DESCRIPTION OF THE PREFERRED EMBODIMENTS

Diffusion controlled reactions due to their extreme temperature dependence greatly influence the metallurgical structure of a system consisting of a coating and a metal substrate. Thus, by choosing the correct coating, one that exhibits easily detectable metallurgical changes either at the coating/substrate surface or in the coating itself as a function of temperature, it is possible to irreversibly record the exposure temperature of a part, such as a blade or vane. And the metallurgical changes that occur have been found to be predictably precise.

For a nickel-base superalloy containing at least about 5 percent refractory metal, including such alloys as B–1900 (3,310,399), IN100 (3,061,426) and other alloys of this general type, the slurry coating composition (JoCoat) as shown by Joseph (3,102,044) has been used satisfactorily, with the processing therefor modified somewhat to establish a definite consistent baseline.

Normal processing for JoCoat involves a heat treatment of about 1,975°F. for 4 hours followed by a treatment of 1,650°F. for about 10 hours. For mapping purposes a green JoCoat is preferred involving a single heat treatment at 1,400°F. for about 4 hours to place the JoCoat in a metastable condition involving limited coating/substrate diffusion, as necessary for adherence, but a capability is retained for further diffusion. It should be noted that at the 1,400°F. temperature level the coating/substrate reaction is primarily associated with an inward migration of aluminum but no outward movement of nickel. The temperature capability of the system is between about 1,450°F. and the coating melting temperature of about 2,100°F.

One more area of consideration should also be mentioned here. It is, of course, important that the coating be adapted to the particular environment in which exposure is expected, typically a hot, oxidizing atmosphere. If the coating is so severely oxidized that it is lost or oxidation is so gross as to interfere with the endurance of the coating or reproducibility of the diffusion mechanism, the essential purpose of the mapping process will be lost.

Bars of the B–1900 alloy were coated using the slurry method and a mix of 90 percent aluminum/10 percent silicon was applied to the surface of the bars. Heat treatment was 1,350°–1,400°F. for about 4 hours.

Figure 1A:
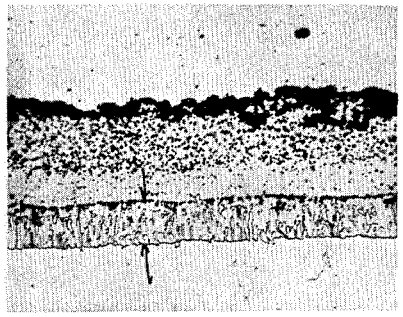
FIGS. 1A – 1E are photomicrographs of a slurry coating of the type disclosed in U.S. Pat. No. 3,102,044 on an alloy of the type disclosed in U.S. Pat. No. 3,310,399, showing the variation in thickness of the refractory metal carbide layer in 100 minutes as a function of temperature.
Figure 1B:
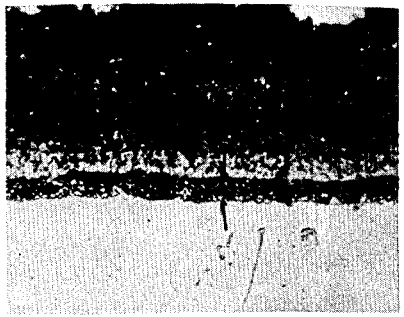
Figure 1C:
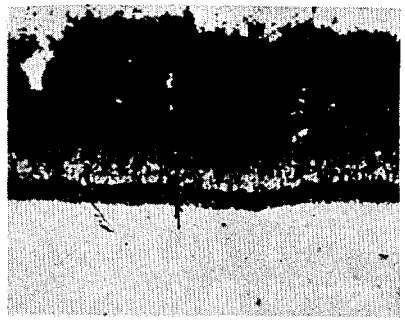
Figure 1D:
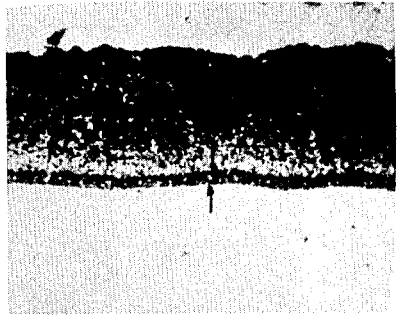
Figure 1E:
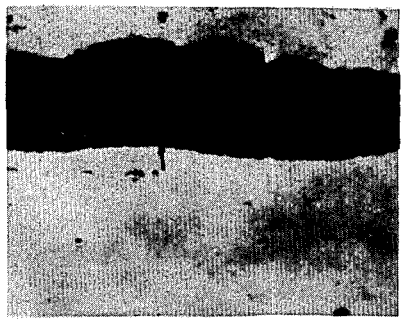

The coated bars were then placed in a gradient furnace and exposed to temperatures ranging from 1,400°F. through 2,100°F. for times of 1 hour and 1 hour and 40 minutes. A similarly coated bar of Udimet 700 was exposed for times up to 5 and 65 hours. The changes in refractory metal carbide layer thickness as a function of temperature were then plotted to establish a baseline. The temperature dependence of this carbide layer thickness is clearly revealed in FIGS. 1A–1E.

A burner rig test was conducted on two production engine blades to determine the ductility of the low temperature diffused coating. Specifically a comparison was made between a conventionally JoCoated blade and a green JoCoated blade. Both were subjected to severe temperature cycling. No cracks were observed in the conventionally coated blade. There were some cracks in the green coated blade but they were not extensive despite the severity of the test.

The technique was then applied to an actual engine blade in an engine.

A plot as in FIG. 2 was made to correlate carbide layer thickness versus temperature using the gradient bars processed for this purpose. Metallographic analysis of the actual blade measuring carbide thickness and converting this to temperature using the graph of FIG. 2 revealed the temperature history of the blade set forth in FIG. 3.

Comparisons between the above results with known structures determined by thermocouple readings on similar blades were very close. Although there was some prior concern, the results indicated that blade curvature had little if any effect on the metallographic structure and, hence, was not a factor influencing the validity of the disclosed technique.

Although the invention has been described in connection with certain materials, examples and preferred embodiments, these are illustrative only. For example, the slurry coating may be replaced by a pack coating process wherein the component is embedded in a pack consisting of about 15 weight percent of an aluminum/silicon alloy containing 12 percent silicon, 2 percent ammonium chloride with the balance alumina, and heating at about 1,400°F. for 4 hours.

Thus, the invention in its broader aspects is not limited to the specific mechanisms described but departures may be made therefrom within the scope of the accompanying claims without departing from the principles of the invention and without sacrificing its chief advantages.

What is claimed is:

1. The method of determining the temperature level and temperature distribution on a high temperature part formed from a nickel-base superalloy containing at least 5 weight percent refractory metal carbide-forming elements which comprises the steps of:

coating the parts with a composition which, upon exposure to a temperature within the range of 1,450°–2,100°F. causes a measurable, irreversible, diffusion reaction in a hot, oxidizing environment as a function of temperature in the general time range of several minutes to several hours, the coating operation being conducted to provide a predetermined reaction condition at the coating/substrate interface including limited coating/substrate diffusion as reflected in a distinct refractory metal carbide layer underlying the coating;

exposing the part to an oxidizing environment including temperatures in the 1,450°–2,100°F. range;

after exposure metallographically analyzing the part in the areas of interest, measuring the extent of the diffusion reaction at these areas as represented by an increase in the carbide layer thickness; and correlating the increase in the carbide layer thickness to generate a time/temperature history and temperature level distribution, representative of the environment to which the part has been exposed.

2. The method according to claim 1 wherein:
the coating composition contains aluminum as its primary coating element.

3. The method according to claim 2 wherein:
in the coating operation, coating temperatures are limited to about 1,400°F.

* * * * *